(12) United States Patent
Gonnella et al.

(10) Patent No.: US 8,291,896 B1
(45) Date of Patent: Oct. 23, 2012

(54) OUTDOOR OVEN AND COOKING SYSTEM

(75) Inventors: George L. Gonnella, Pepperell, MA (US); Robert H. Gonnella, Kittery, ME (US); Iraj Gashgaee, Marlborough, MA (US)

(73) Assignee: Dynamic Engineering Designs LLC, Pepperell, MA (US)

(*) Notice: Subject to any disclaimer, the term of this patent is extended or adjusted under 35 U.S.C. 154(b) by 952 days.

(21) Appl. No.: 12/168,707

(22) Filed: Jul. 7, 2008

Related U.S. Application Data

(60) Provisional application No. 60/958,665, filed on Jul. 6, 2007, provisional application No. 60/974,698, filed on Sep. 24, 2007.

(51) Int. Cl.
*F24C 3/00* (2006.01)
*F24C 3/02* (2006.01)
*F24C 15/34* (2006.01)
*F24C 15/32* (2006.01)
*F24C 15/30* (2006.01)
*F24C 15/16* (2006.01)
*F24C 15/08* (2006.01)
*F24C 15/00* (2006.01)
*F24C 3/14* (2006.01)
*F24C 3/08* (2006.01)

(52) U.S. Cl. ............... 126/39 C; 126/19 R; 126/273 R; 126/375 R

(58) Field of Classification Search ............... 126/39 C, 126/273 R, 19 R, 275 R
See application file for complete search history.

(56) References Cited

U.S. PATENT DOCUMENTS

| | | | | |
|---|---|---|---|---|
| 16,031 A | * | 11/1856 | Shaw | 126/40 |
| 129,555 A | * | 7/1872 | Hauck | 431/230 |
| 208,317 A | * | 9/1878 | Howse | 126/45 |
| 226,010 A | * | 3/1880 | Whitmore | 126/45 |
| 233,983 A | * | 11/1880 | Clinton | 248/150 |
| 255,865 A | * | 4/1882 | Hull | 126/275 R |
| 274,426 A | * | 3/1883 | West | 126/50 |
| 305,113 A | * | 9/1884 | Sharp | 126/275 R |
| 305,790 A | * | 9/1884 | Burgess | 126/265 |
| 401,723 A | * | 4/1889 | Stubbers | 126/275 R |
| 402,978 A | * | 5/1889 | Sager | 126/275 R |
| 514,079 A | * | 2/1894 | Jehu | 126/275 R |
| 520,188 A | * | 5/1894 | Newsome | 126/260 |
| 563,928 A | * | 7/1896 | Huenefeld | 126/275 R |
| 587,528 A | * | 8/1897 | Inman | 126/275 R |
| 639,646 A | * | 12/1899 | Adler | 126/275 R |

(Continued)

FOREIGN PATENT DOCUMENTS

EP 511052 A1 * 10/1992

(Continued)

*Primary Examiner* — Carl Price
(74) *Attorney, Agent, or Firm* — Sprinkle IP Law Group

(57) ABSTRACT

An outdoor oven may have a cooking chamber defined by six sides. Each of the six sides may be insulated. A front side may have a door for access to the cooking chamber. The cooking chamber may have a baffle and a cooking plane above and separated some distance from the baffle. Heat in the form of a flame may enter the cooking chamber. The baffle may prevent heat from the flame from directly contacting food on the cooking plane, may inhibit heat transfer through the baffle, and/or may direct heated air around the baffle. The heat is circulated through the cooking chamber to heat the food, and exits a vent positioned below the cooking chamber. An outdoor cooking system may include a burner, a support structure and a fuel supply.

20 Claims, 12 Drawing Sheets

U.S. PATENT DOCUMENTS

| | | | | |
|---|---|---|---|---|
| 711,285 | A * | 10/1902 | Carter | 126/275 R |
| 772,999 | A * | 10/1904 | Boeck | 126/273 R |
| 935,189 | A * | 9/1909 | Coles | 126/376.1 |
| 993,241 | A * | 5/1911 | Glover | 126/39 C |
| 1,105,178 | A * | 7/1914 | Boger | 126/275 R |
| 1,168,857 | A * | 1/1916 | Coes | 126/39 C |
| 1,203,960 | A * | 11/1916 | Baxter | 126/39 C |
| 1,239,341 | A * | 9/1917 | Bird | 126/39 C |
| 1,437,812 | A * | 12/1922 | MacMillan | 126/38 |
| 1,514,027 | A * | 11/1924 | Williams | 126/275 R |
| 1,536,244 | A * | 5/1925 | Sussman | 126/275 R |
| 1,608,223 | A * | 11/1926 | Magoon | 126/275 R |
| 2,454,571 | A * | 11/1948 | Rom | 126/275 R |
| 2,575,299 | A * | 11/1951 | Scheel | 126/261 |
| 2,973,756 | A * | 3/1961 | Tylle | 126/266 |
| 3,812,840 | A * | 5/1974 | Whaler | 126/275 R |
| 4,051,837 | A | 10/1977 | Norman | |
| 4,290,408 | A * | 9/1981 | Juett et al. | 126/25 R |
| 4,320,736 | A | 3/1982 | Sharon | |
| 4,406,218 | A * | 9/1983 | Hatakeyama | 99/401 |
| 4,800,865 | A * | 1/1989 | Setzer | 126/21 R |
| 5,195,500 | A | 3/1993 | Lerner | |
| 5,243,961 | A | 9/1993 | Harris | |
| 5,523,104 | A | 6/1996 | Kirk | |
| 5,584,232 | A | 12/1996 | Bush | |
| 5,586,488 | A | 12/1996 | Liu | |
| 5,682,873 | A * | 11/1997 | Chambers | 126/275 R |
| 6,125,835 | A | 10/2000 | Montano | |
| 6,422,231 | B1 * | 7/2002 | Hamilton et al. | 126/38 |
| 6,681,757 | B1 | 1/2004 | Rivero | |
| 6,995,340 | B1 | 2/2006 | Ho | |
| 2007/0221191 | A1 | 9/2007 | O'Brien et al. | |
| 2008/0135037 | A1 | 6/2008 | Hards | |

FOREIGN PATENT DOCUMENTS

FR   2609386 A1 * 7/1988

* cited by examiner

OUTDOOR OVEN AND COOKING SYSTEM

CROSS-REFERENCE TO RELATED APPLICATIONS

This application claims priority from Provisional Patent Applications No. 60/958,665, filed Jul. 6, 2007, entitled "PORTABLE COOKING SYSTEM, APPARATUS AND METHOD" and No. 60/974,698, filed Sep. 24, 2007, entitled "PORTABLE COOKING SYSTEM, APPARATUS AND METHOD," the entire contents of which are expressly incorporated herein by reference for all purposes.

BACKGROUND

1. Field of the Disclosure

The present disclosure generally relates to outdoor ovens. Embodiments of the disclosure relate to ovens, apparatuses and systems for cooking outdoors.

2. Description of Related Art

Outdoor cooking is desirable for camping, tailgating, and other outdoor activities. Outdoor cooking devices such as grills are generally manufactured from cast aluminum to reduce manufacturing costs or to minimize weight. Access to food being cooked is either by a door on the front of the outdoor cooking device or a lid lowered over the device. Food may be cooked using direct heat by placing the food directly over the heat source. Food placed on an unheated side of the grill may be cooked by indirect heat coming from a heated side of the grill.

Outdoor cooking devices typically use either charcoal or propane as a fuel. As the fuel burns, heat in the form of direct or indirect heat cooks the food. In the case of propane fuel, propane flows from the burner through a plurality of holes, generally at a low flow rate (i.e., small flame height) to prevent burning or charring the food.

A disadvantage with some prior art cooking devices is that they are uninsulated or poorly insulated, resulting in the inefficient use of heat. For purposes of this document, the terms "uninsulated" and "poorly insulated" may refer to low thermal resistance properties. A solid wall with high thermal conductance may be uninsulated. For example, many outdoor grills are manufactured from cast aluminum. Aluminum is a lightweight metal, but has a high associated thermal conductivity. As a result, a grill manufactured from aluminum may dissipate heat through the casing. A wall constructed of a material with high thermal resistance but having openings for heat to escape and having hinges, fittings, or other features with low thermal resistance to allow heat to escape may be poorly insulated. For example, some camping ovens are manufactured to enable a user to set up and collapse the oven for ease of portability. As a result the oven may have slots or other openings. The inefficient use of heat limits the quality of food that can be cooked on the cooking device. Hot spots, burned food, undercooked food, dried out food and the like are possible when using a cooking device that has inefficient use of fuel.

SUMMARY

An outdoor oven or cooking system may be configured for transportation to an outdoor location. An outdoor oven or cooking system may be transported to a location and set up for cooking. An outdoor oven or cooking system may be set upon an existing heat source. An outdoor oven or cooking system may include a heat source. An outdoor oven or cooking system may include a fuel source. An outdoor oven or cooking system may be used to heat foods to a desired temperature for a selected period of time. An outdoor oven or cooking system may be reconfigured for transportation.

An outdoor oven may be insulated to prevent heat loss. An outdoor oven may utilize double wall insulated sides and an insulated door to inhibit heat loss. An outdoor oven may heat foods to a desired temperature with minimal heat loss to the environment. An outdoor oven may prevent heat from being in direct contact with food in the cooking chamber. An outdoor oven may circulate heat through the cooking chamber for even cooking. An outdoor oven may have one or more vents positioned below a cooking plane for directing the flow of heated air circulating through the cooking chamber.

Some embodiments disclosed herein may be directed to an outdoor oven. An outdoor oven may include a cooking chamber having a cooking plane for supporting items to be heated, a baffle, six insulated sides including a door on a front side and an opening on the bottom side for receiving heat into the cooking chamber, and a vent. Heat in the form of a flame may enter the cooking chamber through the opening in the bottom of the cooking chamber. Heat from the flame contacts the baffle, which may have a selected thickness, be made from a selected material, or have some other property to inhibit heat from the flame to transfer directly to the items on the cooking plane. The heat may be directed around the baffle in the form of heated air. The velocity of the flame and the size and position of one or more of the baffle and vent cooperate to circulate heat through the cooking chamber to heat the items on the cooking plane. In some embodiments, the vent may be located below the cooking plane. In some embodiments, heat exits the cooking chamber substantially through the vent. In some embodiments, the six insulated sides comprise an inner wall, an outer wall separated from the inner wall, and a layer of insulation disposed between the inner wall and the outer wall. In some embodiments, the outdoor oven comprises a fuel source for supplying heat and a base for supporting the cooking chamber. The base may include a top side having an opening corresponding to the opening in the bottom side of the cooking chamber, a burner connected to the fuel source and positioned in the opening in the top side of the base, a burner control valve for controlling the fuel flow from the fuel source to the burner, and four sides extending down from the top side. In some embodiments, the size and position of one or more of the burner, the baffle and the vent cooperate to circulate heat through the cooking chamber. In some embodiments, the base or support assembly comprises a set of legs for supporting one or more of the cooking chamber, a base, and the fuel source. In some embodiments, the burner has a plurality of openings. In some embodiments, heat in the form of a flame flows from the burner vertically, such that when the fuel flow is at a selected rate, the flame contacts the lower surface of the baffle. In some embodiments, the door has a first portion and a second portion. The first portion may have a first height, first width and first depth. The second portion may have a second height, second width and second depth. In some embodiments, the first portion seats inside the inner walls of the cooking chamber when the cooking chamber is in a closed configuration and the second portion abuts the outer walls of the cooking chamber when the cooking chamber is in a closed configuration. In some embodiments, the vent is located on one or more of the sides. In some embodiments, the baffle comprises metal, ceramic, or some other thermally resistive material or combination of materials. In some embodiments, the baffle has a selected thickness to inhibit heat transfer through the baffle.

Some embodiments disclosed herein may be directed to an outdoor cooking system. The outdoor cooking system may include a cooking chamber formed by six insulated sides, a fuel source, and a base. In some embodiments, the cooking chamber may include a cooking plane for supporting items to be heated and a baffle having an upper surface and a lower surface and located a distance below the cooking plane. In some embodiments, heat entering the cooking chamber in the form of a flame contacts the baffle. In some embodiments, the baffle has an associated thickness between the upper surface and the lower surface to inhibit heat transfer through the baffle. In some embodiments, the baffle forces heat to propagate around the baffle. In some embodiments, the six sides include a bottom side comprising an opening for receiving heat, a front side having a door, and a vent located below the level of the cooking plane. In some embodiments, heat exits the cooking chamber substantially through the vent. In some embodiments, the base has a top side having an opening corresponding to the opening in the bottom side of the cooking chamber, a burner connected to the fuel source and positioned in the opening in the top side of the base, a burner control valve for controlling the fuel flow from the fuel source to the burner, and four sides extending down from the top side. In some embodiments, the size and position of one or more of the burner, the baffle and the vent cooperate to circulate heated air through the cooking chamber. In some embodiments, the six insulated sides have an inner wall, an outer wall separated from the inner wall, and a layer of insulation disposed between the inner wall and the outer wall. In some embodiments, the base comprises a set of legs for supporting one or more of the cooking chamber, the base, and the fuel source. In some embodiments, the burner has a plurality of openings such that heat in the form of a flame flows from the burner vertically. In some embodiments, when the fuel flow is at a selected rate, the flame contacts the lower surface of the baffle. In some embodiments, the door comprises a first portion having a first height, first width and first depth and a second portion having a second height, second width and second depth. In some embodiments, the first portion seats inside the inner walls of the cooking chamber when the cooking chamber is in a closed configuration and the second portion abuts the outer walls of the cooking chamber when the cooking chamber is in a closed configuration. In some embodiments, the vent is located on one or more of the sides of the cooking chamber. In some embodiments, the baffle comprises metal, ceramic, or some other thermally resistive material or combination of materials. In some embodiments, the baffle has a selected thickness to inhibit heat transfer through the baffle.

Other objects and advantages of the embodiments disclosed herein will be better appreciated and understood when considered in conjunction with the following description and the accompanying drawings.

BRIEF DESCRIPTION OF THE DRAWINGS

Advantages of the present disclosure will become apparent to those skilled in the art with the benefit of the following detailed description and upon reference to the accompanying drawings in which.

Figure 1:
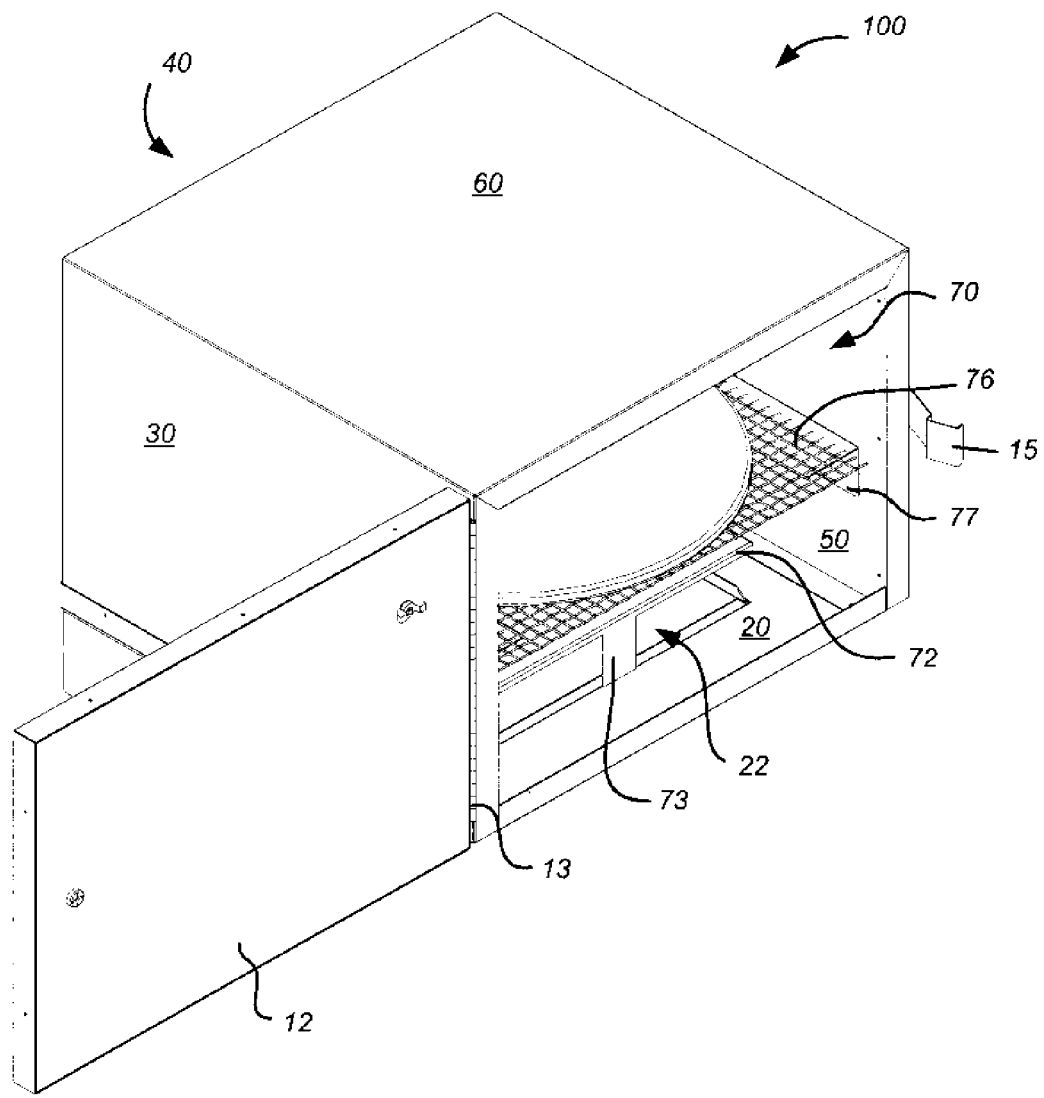
FIG. 1 depicts a perspective view of one embodiment of an outdoor oven.

While the disclosure is susceptible to various modifications and alternative forms, specific embodiments thereof are shown by way of example in the drawings and will herein be described in detail. The drawings may not be to scale. It should be understood that the drawings and detailed description thereto are not intended to limit the disclosure to the particular form disclosed, but on the contrary, the intention is to cover all modifications, equivalents, and alternatives falling within the spirit and scope of the present disclosure as defined by the appended claims.

DETAILED DESCRIPTION

The inventive outdoor oven and cooking system and the various features and advantageous details thereof are explained more fully with reference to the non-limiting embodiments detailed in the following description. Descriptions of well known starting materials, manufacturing techniques, components and equipment are omitted so as not to unnecessarily obscure the disclosure in detail. Skilled artisans should understand, however, that the detailed description and the specific examples, while disclosing preferred embodiments of the disclosure, are given by way of illustration only and not by way of limitation. Various substitutions, modifications, and additions within the scope of the underlying inventive concept(s) will become apparent to those skilled in the art after reading this disclosure. Skilled artisans can also appreciate that the drawings disclosed herein are not necessarily drawn to scale.

As used herein, the terms "comprises," "comprising," includes, "including," "has," "having" or any other variation thereof, are intended to cover a non-exclusive inclusion. For example, a process, product, article, or apparatus that comprises a list of elements is not necessarily limited to only those elements, but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to a particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms.

Language designating such non-limiting examples and illustrations includes, but is not limited to: "for example," "for instance," "e.g.," "in one embodiment," and the like.

An outdoor oven may be used in a backyard, in a campground, at a tailgate event, or some other function to cook food. Outdoor ovens may be used for baking, broiling, reheating, and other forms of cooking. Outdoor ovens may be used for cooking at temperatures ranging from about 200 degrees Fahrenheit (F) to over 600 degrees F. Cooking may involve preheating a cooking chamber to a desired temperature, maintaining the temperature of the cooking chamber at that temperature for a period of time, and then removing the heat. Cooking a pizza generally requires pre-heating the oven to about 450-600 degrees F. and then holding the temperature steady. Some embodiments disclosed herein may be pre-heated to about 450-600 degrees F. and can cook a pizza in less than 6 minutes.

An outdoor oven may be transported to a desired location. An outdoor oven may be transported to a location, configured for cooking, receive heat in a cooking chamber to raise the temperature in the cooking chamber to a desired amount, receive heat to maintain the temperature inside the cooking chamber at the desired temperature until the food is cooked, have the heat removed from the cooking chamber, and be reconfigured for transportation. In some embodiments, an outdoor oven may be used to cook pizzas.

Outdoor ovens may be used for camping. Camping may involve transporting the outdoor oven to a location near a camp site and then manually moving the outdoor oven into the campsite. The campsite may or may not have tables, a grill, or an improved cooking area. Camping outdoors may expose the outdoor oven to wind, rain, cold, and other elements. Fires may be started accidentally if cooking devices are allowed to get too hot. Outdoor ovens may be used for tailgate parties. Tailgate parties may be found outside stadiums before sporting events. Cooking at a tailgate party in New England in December may involve cooking in temperatures below 32 degrees F. Wind, rain and snow are also possible. An outdoor oven may be used for cooking in a backyard. Backyard parties with friends may provide an opportunity to cook outdoors. Other outdoor events such as concerts, plays, or other social or sporting events may be enjoyed by people cooking outdoors.

Cooking outdoors may involve connecting a heat source to a cooking device. Propane gas is one example of a fuel commonly used to provide a heat source for cooking outdoors. A valve may be turned to allow propane to flow out of the tank to a burner. By opening the valve, the flow of propane to the burner may be increased or decreased. The number and size of the openings in the burner may determine the flow rate of the propane. The position, orientation, and configuration of the openings in the burner may dictate whether the burner is a high velocity burner. Striking a match or using some other igniter causes the propane to burn.

Some embodiments disclosed herein may be described as they may be used for cooking pizza. However, pizza is just one food item that may be cooked in an outdoor oven and other food items are contemplated. Some embodiments disclosed herein may be equally used to prepare items in pans or dishes, such as casseroles and raw foods such as baked potatoes. Some embodiments disclosed herein may be useful for baking, searing, broiling, or otherwise cooking food items.

Figure 2:
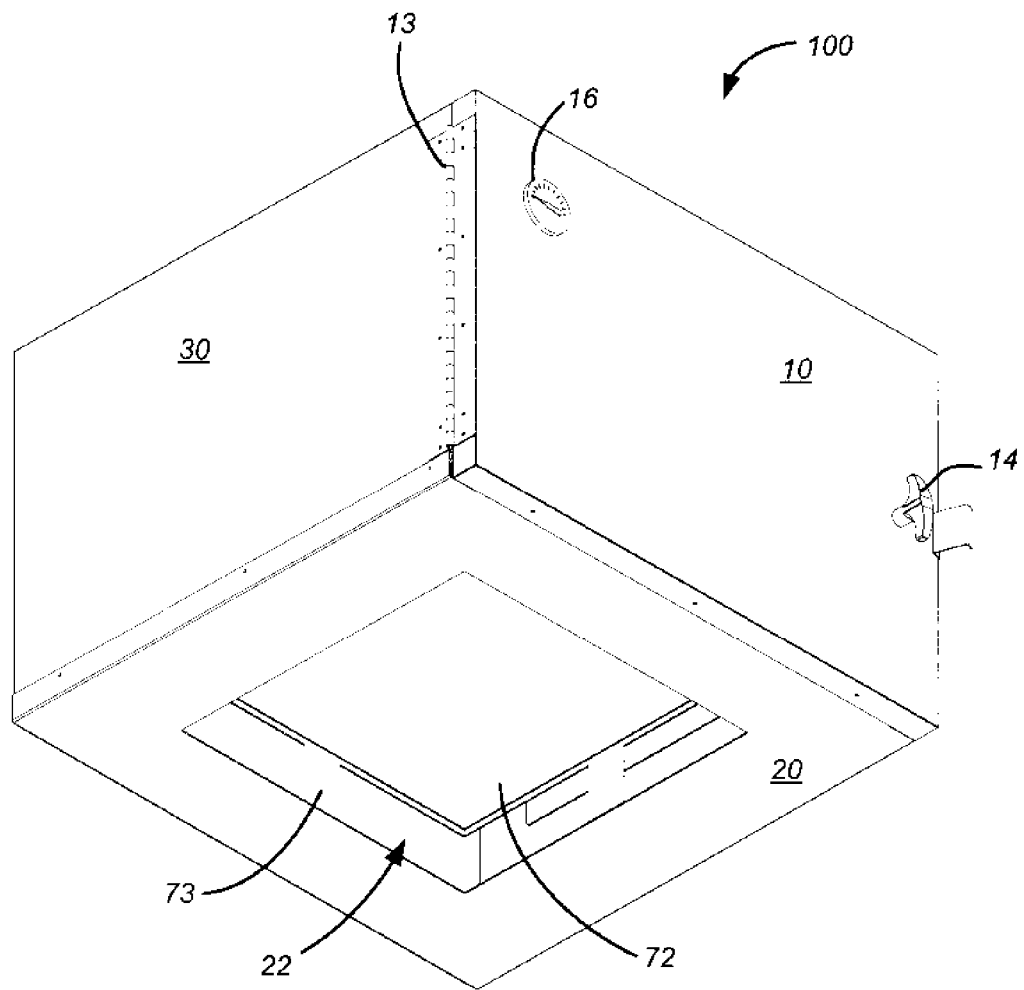
FIG. 2 depicts a perspective view of one embodiment of an outdoor oven.

FIGS. 1 and 2 depict perspective views of one embodiment of outdoor oven 100 that may be used to cook food. FIG. 1 depicts one embodiment of outdoor oven 100 with door 12 open. FIG. 2 depicts one embodiment of outdoor oven 100 with door 12 closed. Outdoor oven 100 may have six sides 10, 20, 30, 40, 50 and 60 and having door 12 on front side 10 and opening 22 on bottom 20. Sides 10, 20, 30, 40, 50 and 60 may form cooking chamber 70. Cooking chamber 70 may include baffle 72 supported by struts 73 and may also include cooking plane 76 supported by shelves 77. Heat in the form of a flame may enter cooking chamber 70 to heat food placed on cooking plane 76. Baffle 72 may direct heat in the form of heated air around baffle 72 into cooking chamber 70. Heated air may circulate throughout cooking chamber 70 to cook food items placed on cooking plane 76. Air may exit cooking chamber 70 via a vent located on one or more of sides 30, 40 and 50 (discussed below).

In some embodiments, insulated sides 10, 20, 30, 40, 50 and 60 may inhibit heat loss from outdoor oven 100. Each side 10, 20, 30, 40, 50 or 60 of outdoor oven 100 may be formed having a continuous surface. Having a continuous surface may be advantageous for preventing wind, rain, snow or other elements from entering cooking chamber 70. If wind is allowed to enter a cooking device through openings or slots, cold air may prevent the cooking device from maintaining a constant temperature, resulting in longer cooking times, uneven cooking, drying out food items, disparity in how fast food cooks, and other undesirable effects. In some embodiments, side 30, top 60 and side 50 of outdoor oven 100 may be formed from a single piece of material that is bent or curved. In some embodiments, sides 30, 40 and 50 are formed from a single piece of material that is bent or curved.

In some embodiments, front side 10 includes door 12. In some embodiments, front side 10 includes door 12 and an outer frame (not shown). Door 12 may include hinges 13, handle 14 and latch 15. Hinges 13 may allow door 12 to open for access to cooking chamber 70. As depicted in FIGS. 1 and 2, hinges 13 may connect door 12 to side 30 such that door 12 may open to one side. In some embodiments, hinges 13 may connect door 12 to bottom 20 of outdoor oven 100 to allow door 12 to open down. In some embodiments, hinges 13 may connect door 12 to top side 60 of outdoor oven 100 to allow door 12 to open up. In some embodiments, hinges 13 may connect door 12 to side 30 or 50 of outdoor oven 100 to allow door 12 to open to the left or ride side. Hinges 13 may be located on the outside of outdoor oven 100 or inside cooking chamber 70. In some embodiments, side 10, 30, 50 or 60 may include thermometer 16 to provide temperature measurements of cooking chamber 70.

In some embodiments, door 12 may have a single thickness such that the edges of door 12 may abut sides 20, 30, 50 and 60 to close cooking chamber 70. In some embodiments, door 12 may have an inner portion with a geometric configuration (i.e., a height, width and depth). In some embodiments, the geometric configuration may provide for seating inside cooking chamber 70. In some embodiments, door 12 may have an outer portion with a geometric configuration (i.e., a height, width and depth) for seating outside cooking chamber 70. The inner portion may be shaped and sized to seat inside sides 20, 30, 50 and 60 and the outer portion may be shaped and sized to abut sides 20, 30, 50 and 60 to close cooking chamber 70. In doing so, cooking chamber 70 may be further insulated to prevent heat loss.

A handle may be desirable for opening and closing door 12. In some embodiments, handle 14 may be positioned on door 12 approximately opposite hinges 13. In some embodiments, handle 14 may be pulled to open door 12 for access to cooking chamber 70. In some embodiments, handle 14 may be rotated to open door 12 for access to cooking chamber 70. In some embodiments, handle 14 may be insulated. In some embodiments, latch 15 may be used to ensure door 12 remains shut during use. In some embodiments, latch 15 may be located opposite hinges 13. In some embodiments, handle 14 and latch 15 may be integrated such that rotating handle 14 may disengage latch 15 to open door 12. In some embodiments, door 12 may include thermometer 16.

Figure 3:
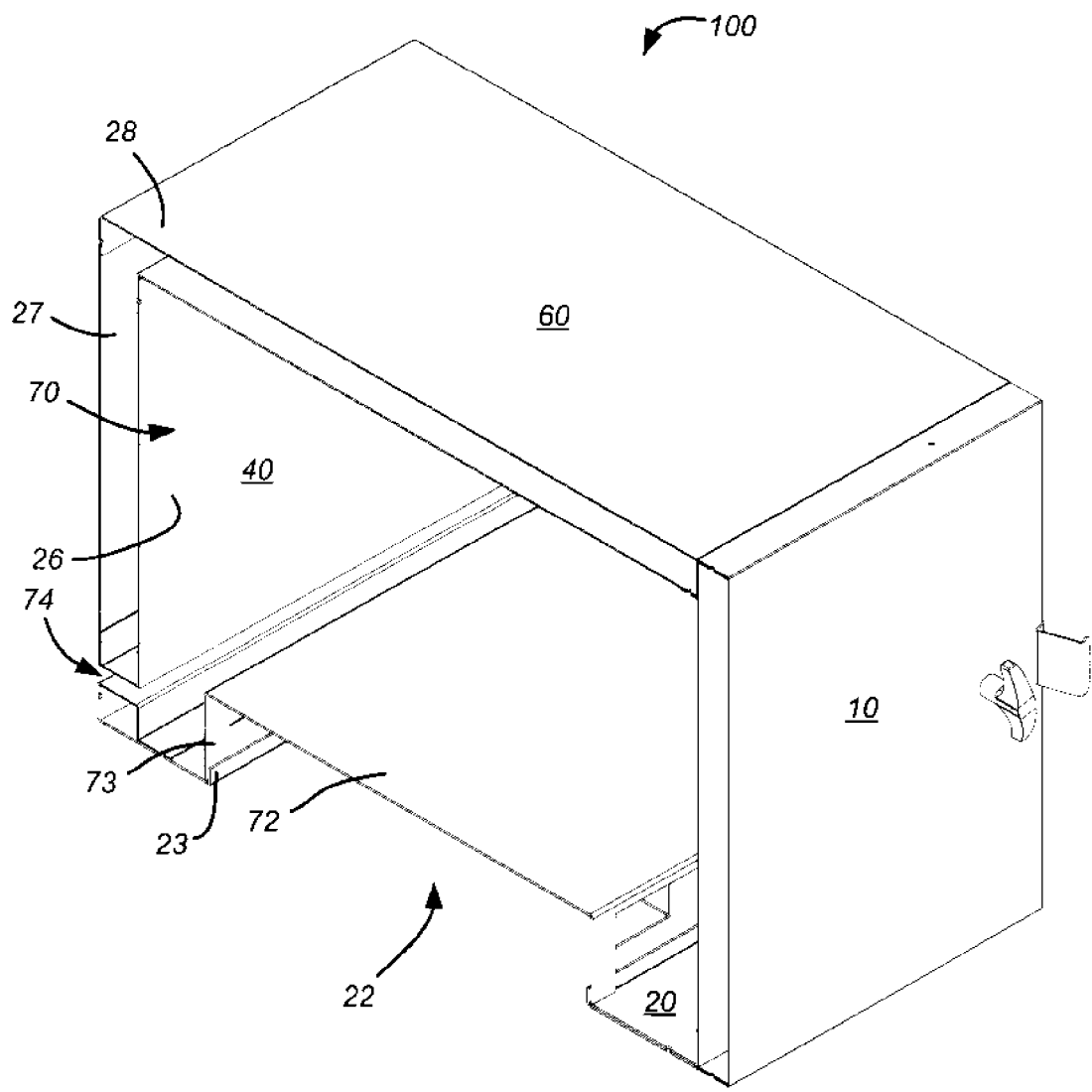
FIG. 3 depicts a cross-section view of one embodiment of an outdoor oven.

FIG. 3 depicts a perspective view of one embodiment of outdoor oven 100 having baffle 72. Heat in the form of a flame may contact baffle 72 in cooking chamber 70. Baffle 72 may inhibit the flame from directly contacting food in cooking chamber 70. Baffle 72 may inhibit direct heat transfer from the flame to food on cooking plane 76. In some embodiments, baffle 72 may improve heat flow through cooking chamber 70. In some embodiments, the thickness of baffle 72 may reduce the conductive and radiant heating of foods placed on cooking plane 76 (not shown in FIG. 3). In FIG. 3, baffle 72 is shown supported by struts 73 connected to bottom side 20. In some embodiments, baffle 72 may be supported by struts 73 connected to any of sides 10, 20, 30, 40, 50 or 60. In some embodiments, struts 73 may form part of baffle 72.

The surface geometry, shape, or dimensions of baffle 72 may affect heat flow through cooking chamber 70. In some embodiments, baffle 72 may have a smooth lower surface or the lower surface may have grooves or some other texturing for improving heat distribution around baffle 72. In some embodiments, baffle 72 may have a desired width or diameter to direct the flow of heat through chamber 70. Baffle 72 may have a circular, square, oval, rectangular, or other curved or angular profile to direct or deflect heat through cooking chamber 70. In some embodiments, the width of baffle 72 may be approximately equal to the width of opening 22 on side 20. In some embodiments, the width of baffle 72 may be greater than the width of opening 22. In some embodiments, tabs 23 on bottom side 20 may align baffle 72 with opening 22.

In some embodiments, baffle 72 may have selected properties or characteristics to inhibit heat transfer through baffle 72. In some embodiments, the material composition of baffle 72 may inhibit heat transfer through baffle 72. In some embodiments, baffle 72 manufactured from a thermally resistive material may inhibit heat transfer through baffle 72. In some embodiments, baffle 72 may be constructed from ceramic, steel, or some other thermally resistive material. In some embodiments, baffle 72 may have a selected thickness to inhibit heat transfer through baffle 72. In some embodiments, the heat transferred through baffle 72 may decrease as the thickness of baffle 72 increases.

Each side 10, 20, 30, 40, 50 and 60 of outdoor oven 100 may be thermally resistive. Thermal resistance may inhibit heat from escaping from cooking chamber 70. Thermal resistance may inhibit wind, snow, rain, or other cooling effects from affecting the temperature inside cooking chamber 70. In some embodiments, each of sides 10, 20, 30, 40, 50 and 60 may be manufactured from thin gauge sheet metal. In some embodiments, each of sides 10, 20, 30, 40, 50 and 60 may include inner wall 26 and outer wall 28 manufactured from thin gauge sheet metal. In some embodiments, a thickness of inner wall 26 or outer wall 28 may be between 0.03 and 0.1 inches. In some embodiments, a thickness of inner wall 26 or outer wall 28 may be between 0.048 and 0.060 inches. Some embodiments of outdoor oven 100 may benefit from the low thermal conductivity of steel or the low weight of aluminum. Other metals and alloys are also possible.

In some embodiments, inner wall 26 and outer wall 28 may be separated to provide thermal insulation. In some embodiments, a 1 inch gap between inner wall 26 and outer wall 28 may inhibit heat transfer from inner wall 26 to outer wall 28. The gap between inner wall 26 and outer wall 28 may also prevent ambient conditions (i.e., snow, wind, rain, or cold temperatures) from affecting the temperature inside cooking chamber 70.

In some embodiments, insulating one or more of sides 10, 20, 30, 40, 50 and 60 of outdoor oven 100 may include disposing insulating material 27 between inner wall 26 and outer wall 28. In some embodiments, insulating material 27 may be a mineral wool or felt, or some other synthetic or natural material. Utilizing thin gauge sheet metal and disposing insulation between the two walls may provide greater benefits than an uninsulated or poorly insulated wall.

Figure 6:
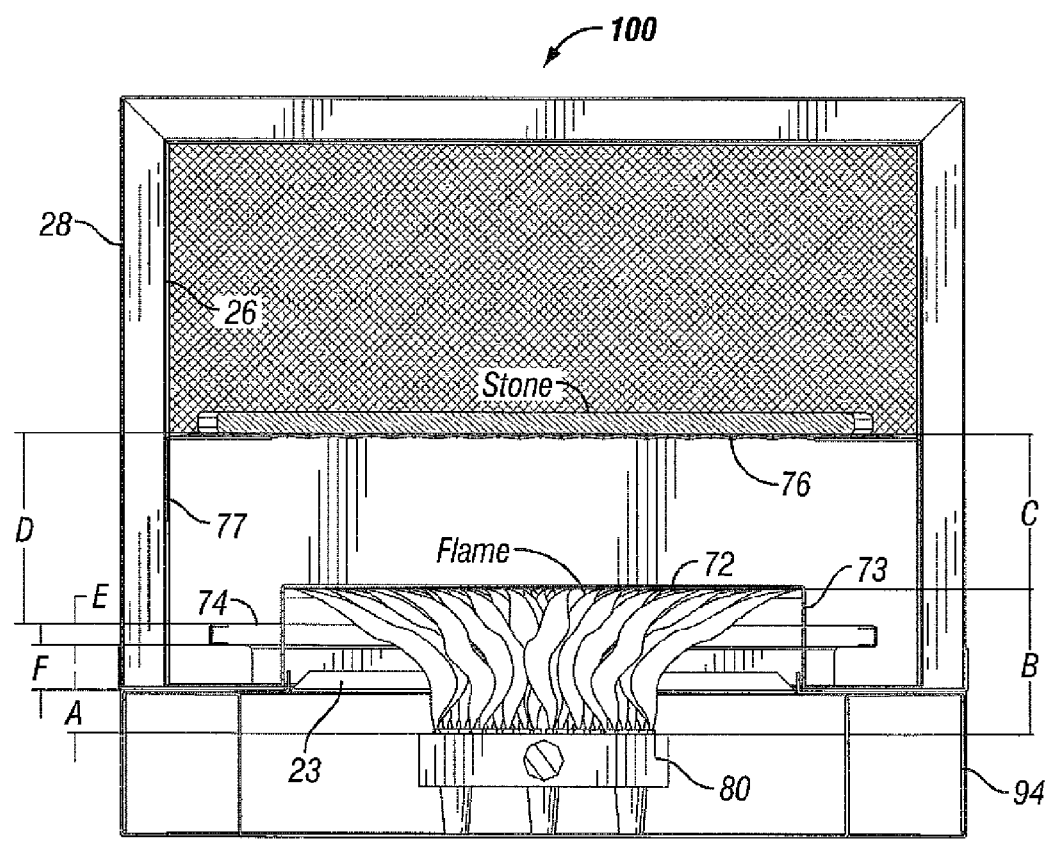
FIG. 6 depicts a cross-section view of one embodiment of an outdoor oven.

In some embodiments, the placement of vent 74 may affect a heating characteristic of outdoor oven 100. Vent 74 provides an opening for heated air to exit cooking chamber 70. In some embodiments, vent 74 may be a slot. In some embodiments, such as depicted in FIG. 6, vent 74 may be formed as a slot on back 40 opposite a side with door 12. In some embodiments, vent 74 may be a series of openings. In some embodiments, vent 74 may be located on side 30, back 40, side 50 or top 60 of outdoor oven 100. In some embodiments, vent 74 may be distributed across sides 30, 40, 50 and 60. For example, vent 74 may be distributed across sides 30, 40 and 50 such that about a third of the total surface area of vent 74 is distributed on each side 30, 40 or 50. In some embodiments, vent 74 may be distributed across a single side 30, 40 or 50. For example, in some embodiments, vent 74 may be a series of openings located on side 40, but there may be more openings closer to the edges than in the middle of side 40. In some embodiments, vent 74 may be shrouded or shielded to ensure hot air is not directly vented to the outside or to prevent outside elements from entering cooking chamber 70 through vent 74. In some embodiments, vent 74 may be shrouded or shielded to reduce energy loss.

Figure 4A:
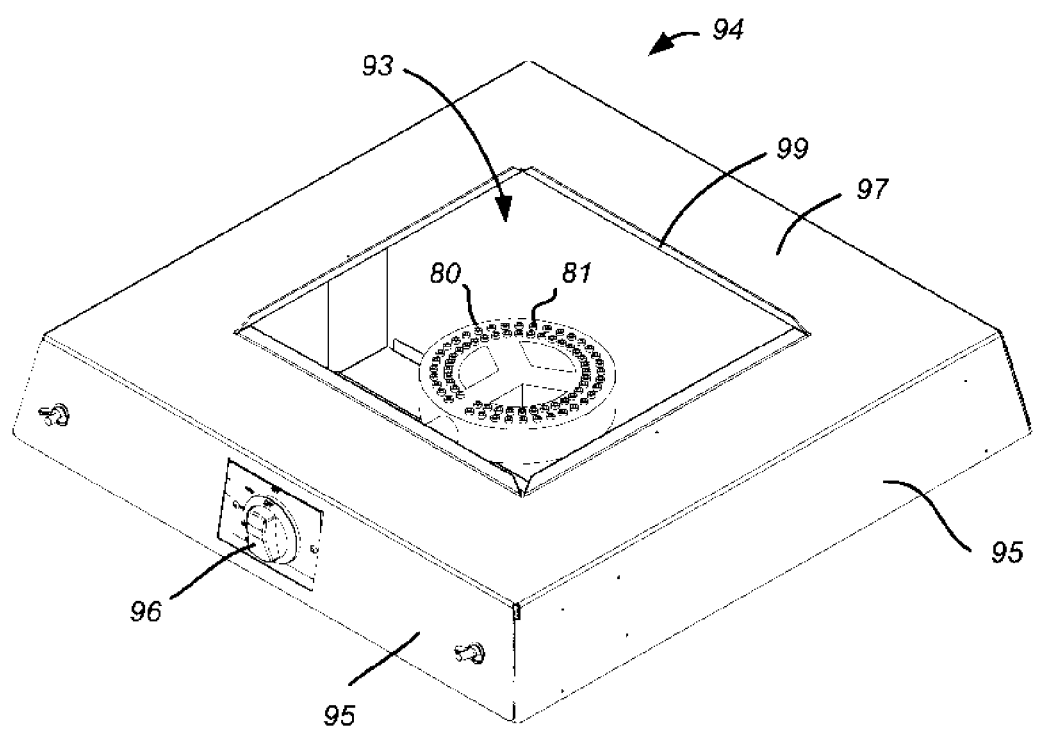
FIGS. 4A and 4B depict perspective and top views of one embodiment of a base.
Figure 4B:
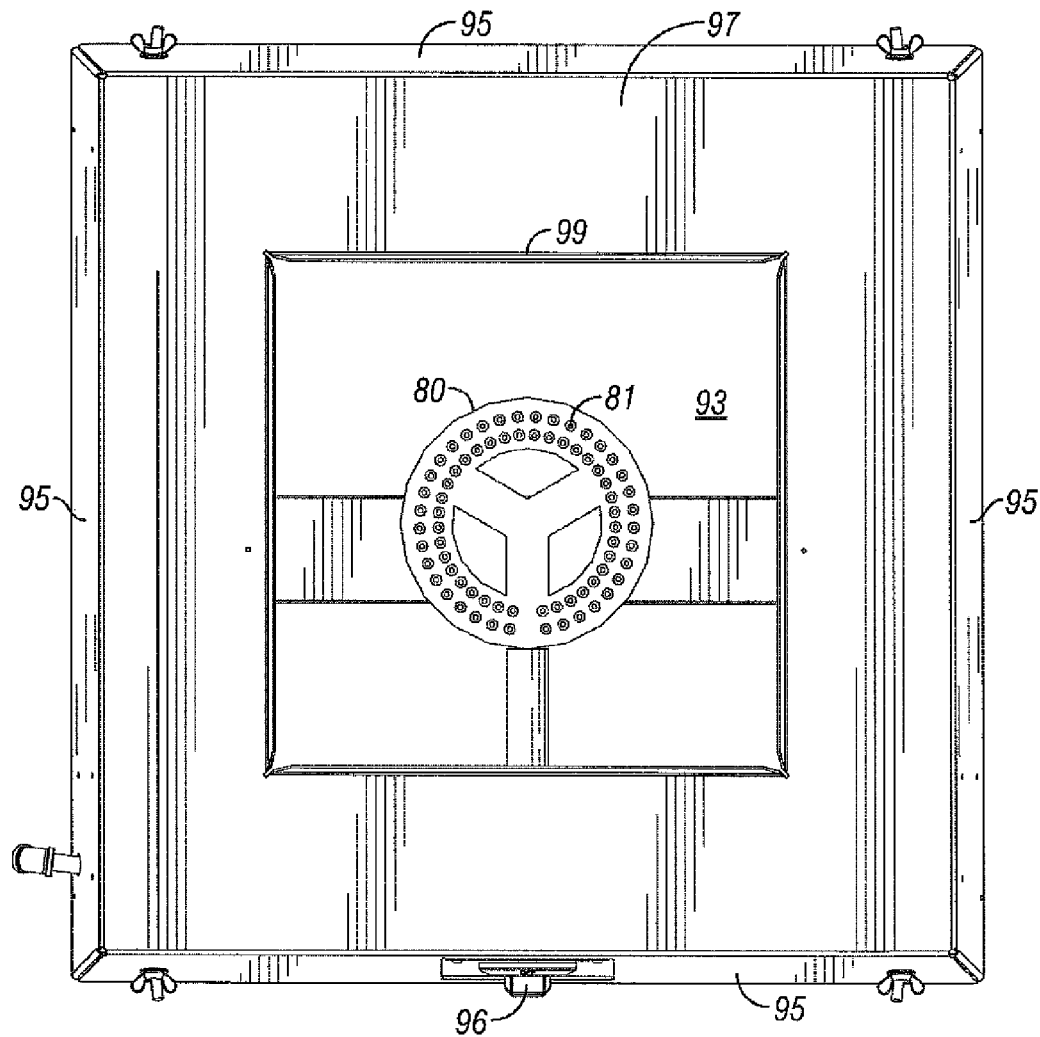

FIGS. 4A and 4B depict perspective and top views of one embodiment of base 94 for providing a heat source to cooking chamber 70. In some embodiments, base 94 includes sides 95 and top side 97. In some embodiments, top side 97 may include opening 93, which may be similar in shape, size and position to opening 22 in bottom side 20 of outdoor oven 100. In some embodiments, base 94 may include burner 80 and control valve 96.

In some embodiments, base 94 may include top side 97. In some embodiments, top side 97 may support outdoor oven 100. In some embodiments, base 94 may include tabs 99. In some embodiments, tabs 99 may extend upward. In some embodiments, tabs 99 may align inside opening 22 when outdoor oven 100 is positioned on base 94 of support assembly 90. In some embodiments, tabs 99 may align opening 22 with burner 80 or may prevent movement of outdoor oven 100 relative to support assembly 90. In some embodiments, tabs 99 may align with tabs 23 on bottom side 20 to align burner 80 with opening 22.

In some embodiments, base 94 may include burner 80. Fuel flowing into burner 80 may be distributed among a plurality of holes 81. Through combustion, the fuel flowing from burner 80 may provide heat in the form of a flame. In some embodiments, the size and number of holes 81 may determine the height a flame can reach. The height of the flame may be an indicator of the velocity of heat energy entering cooking chamber 70. In some embodiments, heat in the form of a flame may enter cooking chamber 70 at a high velocity. In some embodiments, heat entering cooking chamber 70 in the form of a flame from burner 80 may contact baffle 72 and terminate at the point of contact. In some embodiments, heat entering cooking chamber 70 in the form of a flame from burner 80 may contact baffle 72 and flow around an edge of baffle 72.

Heat from the flame may contact baffle 72 to prevent the flame from entering cooking chamber 70 or contacting food items on cooking plane 76. By increasing the velocity of the flame, the velocity of heated air in cooking chamber 70 may be increased. Increasing the velocity of heated air throughout cooking chamber 70 may improve contact of heated air with food items to decrease cooking time, ensure even cooking, improve energy efficiency, or other desirable effects. Heated air may circulate through cooking chamber 70 in proportion to the velocity of the flame exiting burner 80. The heated air may exit vent 74. In some embodiments, the heated air may exit vent 74 as it cools such that air exiting cooking chamber 70 is cooler than air inside cooking chamber 70. In some embodiments, the air entering cooking chamber 70 may reach temperatures of 500-700 degrees Fahrenheit, but may exit vent 74 at 200-400 degrees Fahrenheit.

Figure 5:
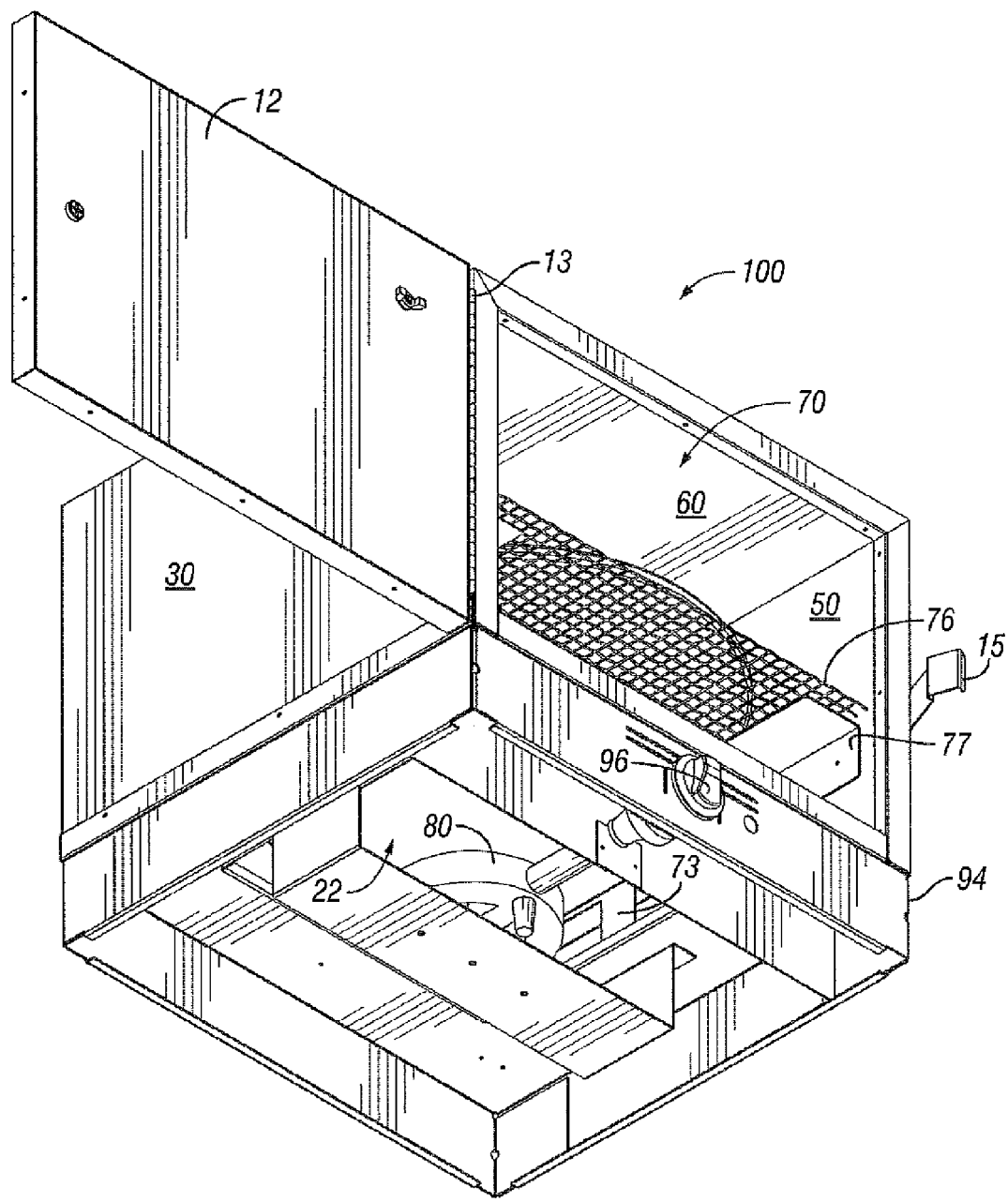
FIG. 5 depicts a perspective view of one embodiment of an outdoor oven.

FIG. 5 depicts a perspective view of one embodiment of outdoor oven 100 including base 94, burner 80 and control valve 96. Fuel may flow through various lines and fittings to control valve 96. Control valve 96 may be turned or otherwise adjusted to provide a selected fuel flow rate to burner 80. Fuel may flow out of burner 80 and burn to form a flame. Heat generated from the combustion of fuel may flow into cooking chamber 70. In some embodiments, opening 22 may be located at a select distance from front side 10 to prevent flames from exiting cooking chamber 70 through door 12 when door 12 is opened. In some embodiments, opening 22 may have a size or shape for use with pre-existing heat sources. In some embodiments, opening 22 may be shaped or sized to accommodate a burner commonly used in outdoor cooking devices such as turkey fryers. Opening 22 may be round, rectangular, or some combination for use with pre-existing heat sources. Bottom 20 may include recesses, tabs, or other features (not shown) for alignment or engagement with a pre-existing heat source.

Cooking food in outdoor oven 100 may involve igniting fuel into a flame and contacting the flame against baffle 72. In some embodiments, heat may enter cooking chamber 70 in the form of a flame. FIG. 6 depicts a cross section view of one embodiment of outdoor oven 100 having burner 80 located at some distance A from bottom side 20 of oven 100 and separated from baffle 72 by distance B, baffle 72 separated from cooking plane 76 by distance C, vent 74 having a height E and positioned below cooking surface 76 by some distance D and above bottom side 20 by distance F.

In some embodiments, outdoor oven 100 may include burner 80 for combusting fuel to form a flame. The flame may be from a natural gas or propane source. The flame may require a minimum amount of air flow. A desired air flow may provide for an optimum flame height. The flame may enter cooking chamber 70 via opening 22 in bottom 20. When heat in the form of a flame contacts baffle 72, baffle 72 may deflect or direct the flame to prevent contact with food items on cooking plane 76. The flame may heat air in cooking chamber 70 and/or air entering cooking chamber 70. In some embodiments, baffle 72 may be positioned a desired distance from bottom side 20. In some embodiments, baffle 72 is positioned a selected distance away from bottom side 20 for improved air flow into cooking chamber 70.

In some embodiments, it is desirable for nearly all heat contacting food items on cooking plane 76 to be the result of heated air circulating around the food items. In some embodiments, baffle 72 may have a thickness or other property to reduce, inhibit, or otherwise control the amount of heat that may transfer through baffle 72. In some embodiments, baffle 72 may have a selected thickness to inhibit heat transfer through baffle. In some embodiments, baffle 72 having a thickness of 0.25 inches may provide enough thermal resistance to restrict heat transfer through baffle 72. In some embodiments, the thickness of baffle 72 may be based on the material from which baffle 72 is manufactured. In some embodiments, baffle 72 manufactured from steel may require a 0.25 inch thickness for reduced heat transfer through baffle 72. Embodiments of baffle 72 manufactured from aluminum, ceramic, stone, or some other material may require a greater or lesser thickness to equal the heat resistance of a 0.25 inch thick baffle manufactured from steel. By choosing an appropriate thickness, material, or other characteristic or property of baffle 72, food in cooking chamber 70 may cook more evenly. Embodiments disclosed herein may not burn the underside of food while the top side of the food remains cold. In some embodiments, a pizza placed on a ceramic stone on cooking plane 76 may be cooked such that the crust is cooked on the bottom as cheese is melted on top.

In some embodiments, the positioning of burner 80, baffle 72, and vent 74 relative to bottom side 20 of outdoor oven 100 may determine the heating characteristics of outdoor oven 100. In some embodiments, heating the air may increase the flow of air in cooking chamber 70. In some embodiments, increasing the flow of heated air in cooking chamber 70 may improve the heating characteristics of outdoor oven 100. In some embodiments, increasing the flow of heated air in cooking chamber 70 may decrease the time needed to preheat cooking chamber 70. In some embodiments, increasing the flow of heated air in cooking chamber 70 may decrease the time needed to cook food items on cooking plane 76. In some embodiments, increasing the flow of heated air over food items on cooking plane 76 may improve the consistency of how the food cooks.

In some embodiments, the positioning of burner 80 relative to bottom side 20 may affect the amount of heat that can enter cooking chamber 70. If burner 80 is positioned too far outside cooking chamber 70 (i.e. distance A in FIG. 6 increases), heat from the flame may not enter cooking chamber 70. For example, a strong wind may blow the flame off to one side such that heat does not flow into cooking chamber 70. If burner 80 is positioned too close to bottom side 20 (i.e., distance A decreases to 0 or becomes negative), the flame may not achieve an optimal flame height. In some situations, the flame could be extinguished due to lack of oxygen. In some embodiments, burner 80 is located outside cooking chamber 70. In some embodiments, the distance A that burner 80 is positioned relative to bottom side 20 may be between 1-2 inches. In some embodiments, a flame height of 2 or more inches from burner 80 positioned 1-2 inches below bottom side 20 may provide sufficient air flow into cooking chamber 70. In some situations, positioning burner 80 a distance of 2 or more inches below bottom side 20 may expose the flame to an air flow that could affect the flame direction or substantially reduce how much heat enters cooking chamber 70. Thus, heat sources such as barbecue grills that provide low flame velocity may not provide enough flame velocity to induce a high flow rate of heated air through cooking chamber 70.

The positioning of baffle 72 relative to burner 80 may affect the amount of heated air that can enter cooking chamber 70. In some embodiments, baffle 72 and burner 80 are separated by distance B such that an aperture (also referred to herein as a gap height) may be formed between baffle 72 and bottom side 20 through which air may enter and exit cooking chamber 70. In some embodiments, a flame positioned below baffle 72 may heat air to induce air flow through the aperture or gap height into cooking chamber 70. If baffle 72 is located too close to burner 80, the gap height between baffle 72 and bottom side 20 may be small such that the volume of air that may flow into cooking chamber 70 may be restricted. Restricting the air flow reduces the amount of heat that can be used for cooking. Overly restricting the air flow into cooking chamber 70 can prevent a flame from contacting baffle 72 or from all the fuel igniting. If baffle 72 is located too far from burner 80, the flame may not contact baffle and/or the gap height between baffle 72 and bottom side 20 may be large such that cool air may be allowed to enter cooking chamber 70, which may reduce the amount of heat that can be used for cooking. In some situations, having an air flow that is too high may reduce the maximum temperature that cooking chamber 70 can achieve because the flame cannot heat enough air. Thus, in some embodiments, positioning baffle 72 a selected distance away from burner 80 allows heat from burner 80 to contact baffle 72 at a high velocity to improve the flow of heated air through cooking chamber 70.

In some embodiments, burner 80 may be positioned approximately 2 inches below bottom side 20 and separated from baffle 72 by about 3.5 inches such that aperture opening is 1.5 inches (i.e., the gap height is 1.5 inches). A flame in contact with baffle 72 with a gap height of 1.5 inches may flow around the edge of baffle 72 such that food items on cooking plane 76 are exposed to direct heat. In some embodiments, burner 80 may be positioned approximately 2 inches below bottom side 20 separated from baffle 72 by about 2.25 inches (i.e., the gap height is 0.25 inches). A flame in contact with baffle 72 at a gap height of 0.25 inches may not flow through the aperture and around the edge of baffle 72 to heat in cooking chamber 70.

Cooking plane 76 may support food items in cooking chamber 70. In some embodiments, cooking plane 76 may be positioned on shelves 77 positioned on inner walls 26 of cooking chamber 70. In some embodiments, shelves 77 may be adjusted up or down based on a desired distance C between baffle 72 and cooking plane 76. In some embodiments, shelves 77 may be rigidly connected to inner wall 26 of cooking chamber 70. In some embodiments, cooking plane 76 may be a wire rack or be manufactured from wire mesh. In some embodiments, cooking plane 76 may be manufactured for direct contact with food items placed in cooking chamber 70. In some embodiments, by positioning cooking plane 76 a selected distance C away from baffle 72, food on cooking plane 76 may be exposed to heated air.

In some embodiments, the position of vent 74 may affect how much heated air may circulate past cooking plane 76. In some embodiments, vent 74 located on top side 60 may reduce the amount of heated air circulating past cooking plane 76. In some embodiments, vent 74 located on one or more of sides 30, 40, and 50 may increase the flow of heated air past cooking plane 76. In some embodiments, vent 74 may be located below cooking plane 76. In some embodiments, placement of vent 74 below cooking plane 76 may ensure heated air circulates through cooking chamber 70 to cook food items on cooking plane 76. In some embodiments, vent 74 located on one or more of sides 30, 40 and 50 and located some distance below baffle 72 may increase the amount of heated air circulating past cooking plane 76. In some embodiments, vent 74 may be positioned some distance F above bottom side 20. In some embodiments, the distances of vent 74 relative to baffle 72 and/or bottom side 20 may determine the width E of vent 74.

The size of vent 74 relative to bottom side 20 or baffle 72 may affect the amount of heated air that contacts food in cooking chamber 70. If the size of vent 70 is small relative to the size of opening 22 or the distance between baffle 72 and bottom side 20, the amount of air that can flow into cooking chamber 70 may be limited by the size or positioning of vent 74. If the size of vent 70 is large relative to the size of opening 22 or the distance between baffle 72 and bottom side 20, the amount of heated air that can flow into cooking chamber 70 may be limited by the size or positioning of burner 80 or the size or positioning of baffle 72 relative to bottom side 20. In some embodiments, the width E of vent 74 may determine how much heated air contacts food items on cooking plane 76, how fast heated air circulates through cooking chamber 70, the maximum temperature of air inside cooking chamber 70, and the like. In some embodiments, such as depicted in FIG. 6, the width of vent 74 may be substantially equal to the width of cooking plane member 76.

In some embodiments, determination of the positioning of one or more of baffle 72, cooking plane 76 and vent 74 may be based on determining an optimal flame height for burner 80, determining a distance A for burner 80 relative to bottom side 20, determining a distance B for separating baffle 72 from bottom side 20, determining a distance C for separating cooking plane 76 from baffle 72, determining a distance D below cooking plane 76 for positioning vent 74, determining a size E of vent 74, and determining a distance F above bottom side 20 for positioning vent 74. By optimizing one or more of distances A, B, C, D, and F or size E, the temperature of cooking chamber 70 may be heated more efficiently and food placed on cooking plane 76 may be cooked evenly. In some embodiments, dimension A may be approximately 1.5 inches. In some embodiments, dimension B may be approximately 3.5 inches. In some embodiments, dimension C may be approximately 4.1 inches. In some embodiments, dimension D may be approximately 5 inches. In some embodiments, dimension E may be approximately 1 inch. In some embodiments, dimension F may be approximately 2 inches.

Figure 7:
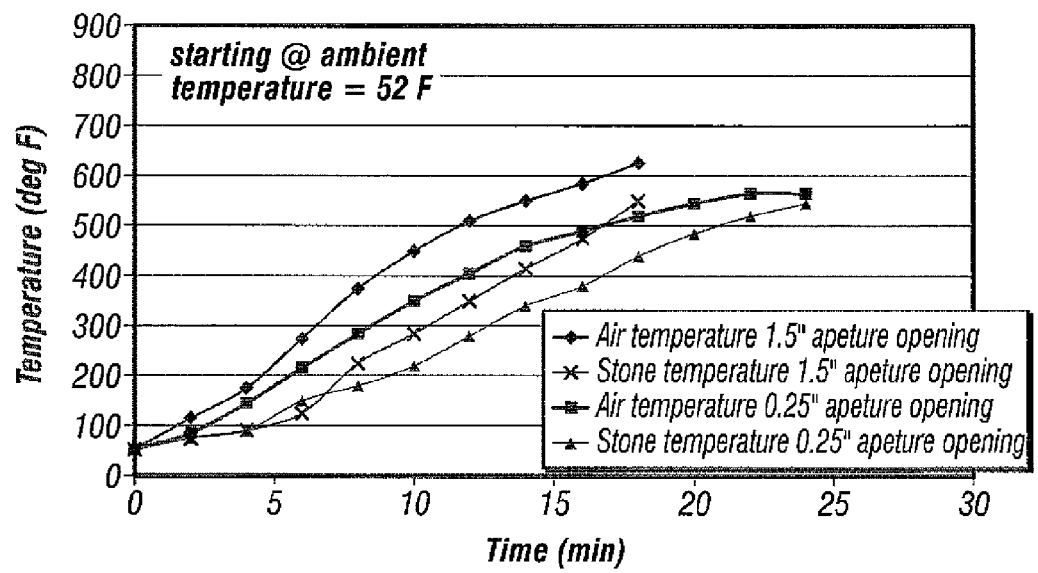
FIG. 7 depicts an exemplary graph of the temperature of a cooking chamber as a function of time for various aperture openings between a baffle and a cooking plane.

Some embodiments disclosed herein may take advantage of the separation between baffle 72 and cooking plane 76 to heat the air inside cooking chamber efficiently. FIG. 7 depicts an exemplary graph of the temperature of cooking chamber 70 as a function of time for various aperture openings (i.e., distances between baffle 72 and bottom side 20). Heat in the form of a flame may enter cooking chamber 70 and may contact baffle 72. Heated air may enter cooking chamber 70 to heat food items on cooking plane 76. As depicted in FIG. 7, cooking chamber 70 may be heated from an ambient temperature (e.g. 52 degrees F.) up to a desired cooking temperature (e.g., 450 degrees F.). A ceramic stone placed on cooking plane 76 may provide an indication of the temperature inside cooking chamber 70 as it is heated. As depicted in FIG. 7, for an aperture opening of approximately 0.25 inches, the ceramic stone may be heated from an ambient air temperature of 52 degrees F. to a temperature of 450 degrees F. in approximately 18 minutes, and the air inside cooking chamber 70 may reach 450 degrees F. in approximately 13 minutes. In some embodiments, aperture opening baffle 72 may be separated from cooking plane 76 by 1.5 inches. Using the same burner setting and also beginning at an ambient air temperature of 52 degrees F., baffle 72 manufactured from ceramic stone may reach a temperature of 450 degrees F. in approximately 15 minutes, and the air inside cooking chamber 70 may reach 450 degrees F. in approximately 9 minutes. In some embodiments, by changing the thickness or other properties of baffle 72, the time needed to heat cooking chamber 70 may be optimized. In some embodiments, by changing the gap between baffle 72 and cooking plane 76, the time needed to heat cooking chamber 70 may be optimized.

Figure 8:
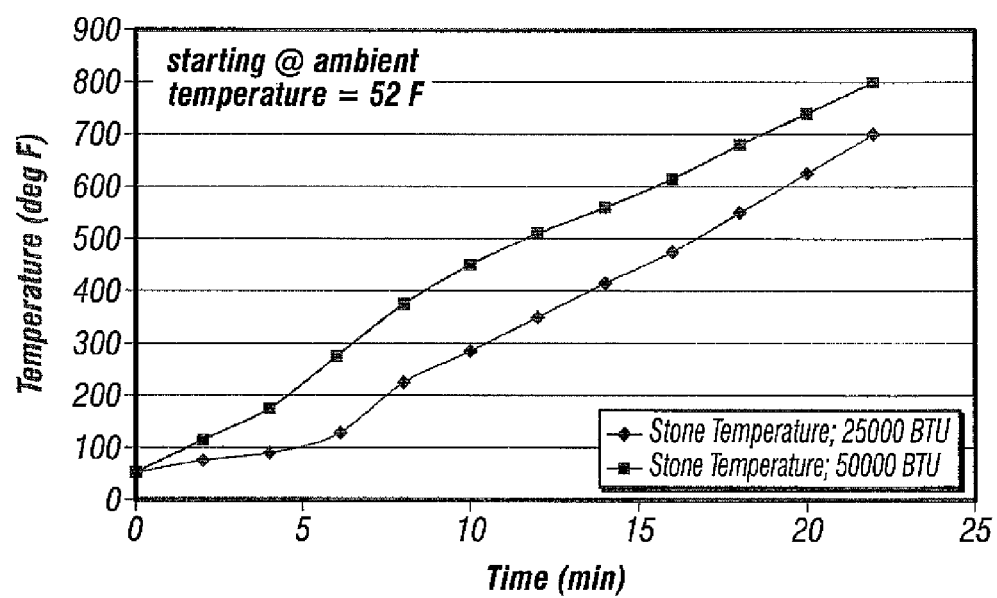
FIG. 8 depicts a graph of the temperature of a cooking chamber as a function of time (or two burner ratings.

FIG. 8 depicts an exemplary graph of the temperature of cooking chamber 70 as a function of time for two burner ratings. In some embodiments, burner 80 may be rated at 25,000 Btu. In some embodiments, burner 80, operating at a 25,000 Btu output and starting at an ambient air temperature of 52 degrees F., may provide enough heated air in cooking chamber 70 to heat a ceramic stone useful for holding food on cooking plane 76 in cooking chamber 70 to 450 degrees F. in approximately 16 minutes. In some embodiments, burner 80 may be able to provide heated air at a 50,000 Btu output. In some embodiments, burner 80 operating at a 50,000 Btu output may provide enough heated air to heat a ceramic stone useful for holding food on cooking plane 76 in cooking chamber 70 to 450 degrees F. in approximately 9 minutes. Those skilled in the art will appreciate that a ceramic stone is just one example of a device useful for holding food items in cooking chamber 70 and that other pans, plates, dishes, bowls and the like may be used as well.

Figure 9A:
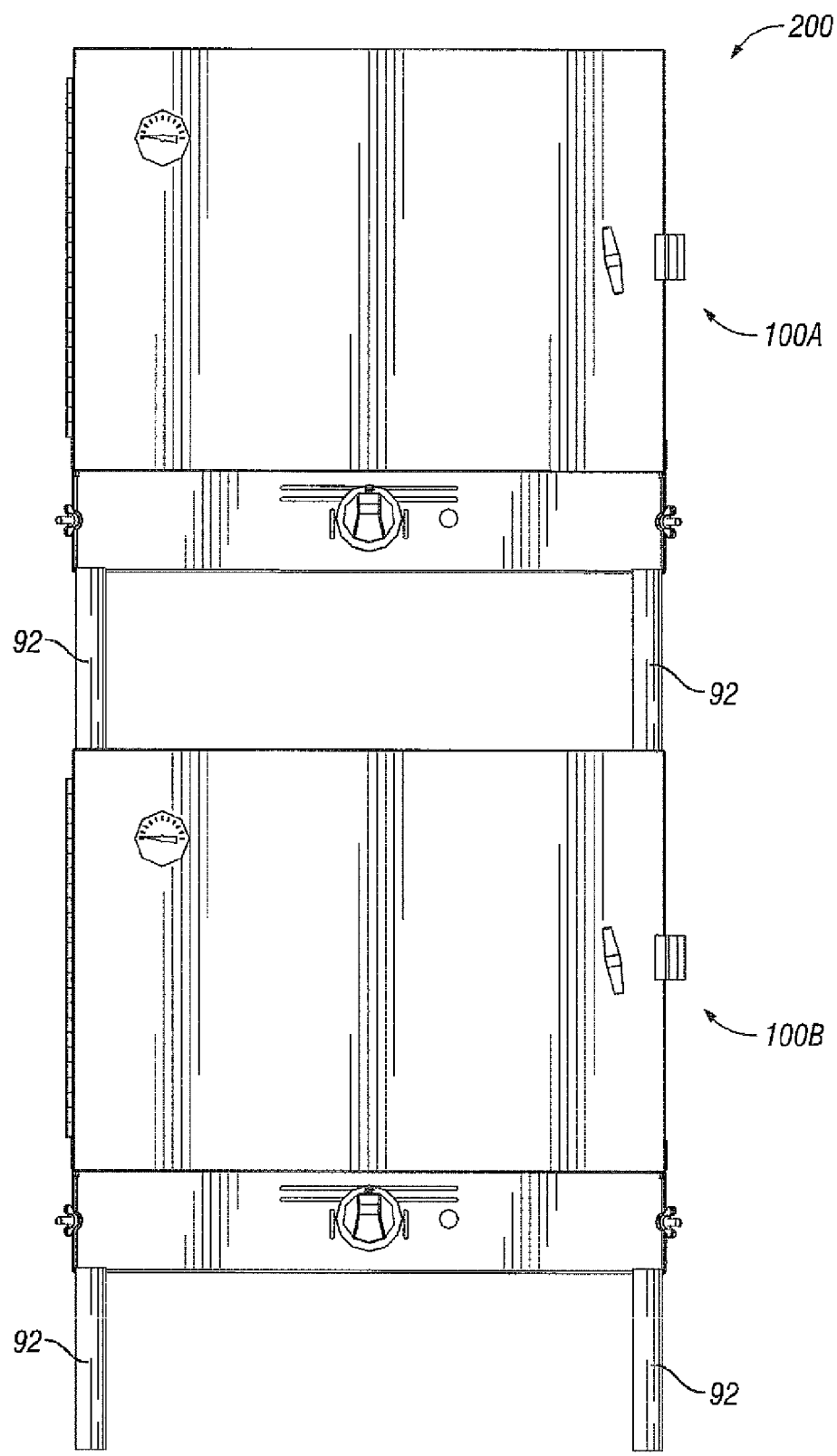
FIGS. 9A and 9B depict front and perspective views of one embodiment of a portion of an outdoor cooking system.
Figure 9B:
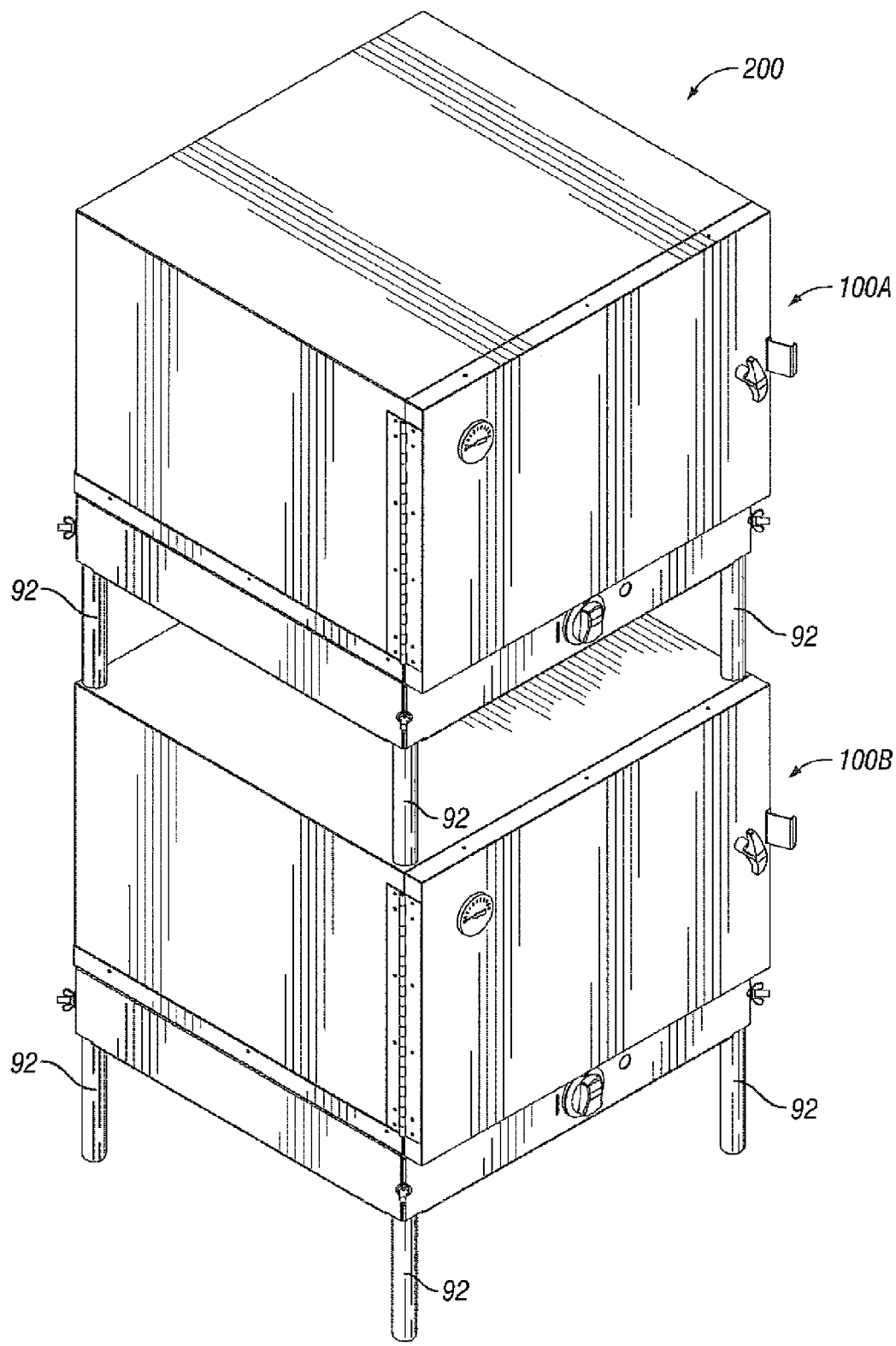

FIGS. 9A and 9B depict front and perspective views of one embodiment of outdoor cooking system 200. Outdoor cooking system 200 may include two or more outdoor ovens 100A and 100B. Outdoor ovens 100A and 100B may be used in a stacked configuration such as depicted in FIGS. 9A and 9B due to door 12 being located on side 10 and vent 74 being located on one or more of sides 30, 40 and 50. Food may be placed in or removed from an upper outdoor oven 100A or a lower outdoor oven 100B independently. Air may be drawn into cooking chamber 70 via opening 22 in either outdoor oven 100A or 100B without affecting air being drawn into another outdoor oven 100A or 100B. Heat exiting a first outdoor oven 100A or 100B may not affect the temperature of cooking chamber 70 in a second outdoor oven 100A or 100B. In some embodiments, legs 92 may be configured to accommodate outdoor oven 100A or 100B. In some embodiments, outdoor oven 100A or 100B may be configured for receiving legs 92.

Figure 10A:
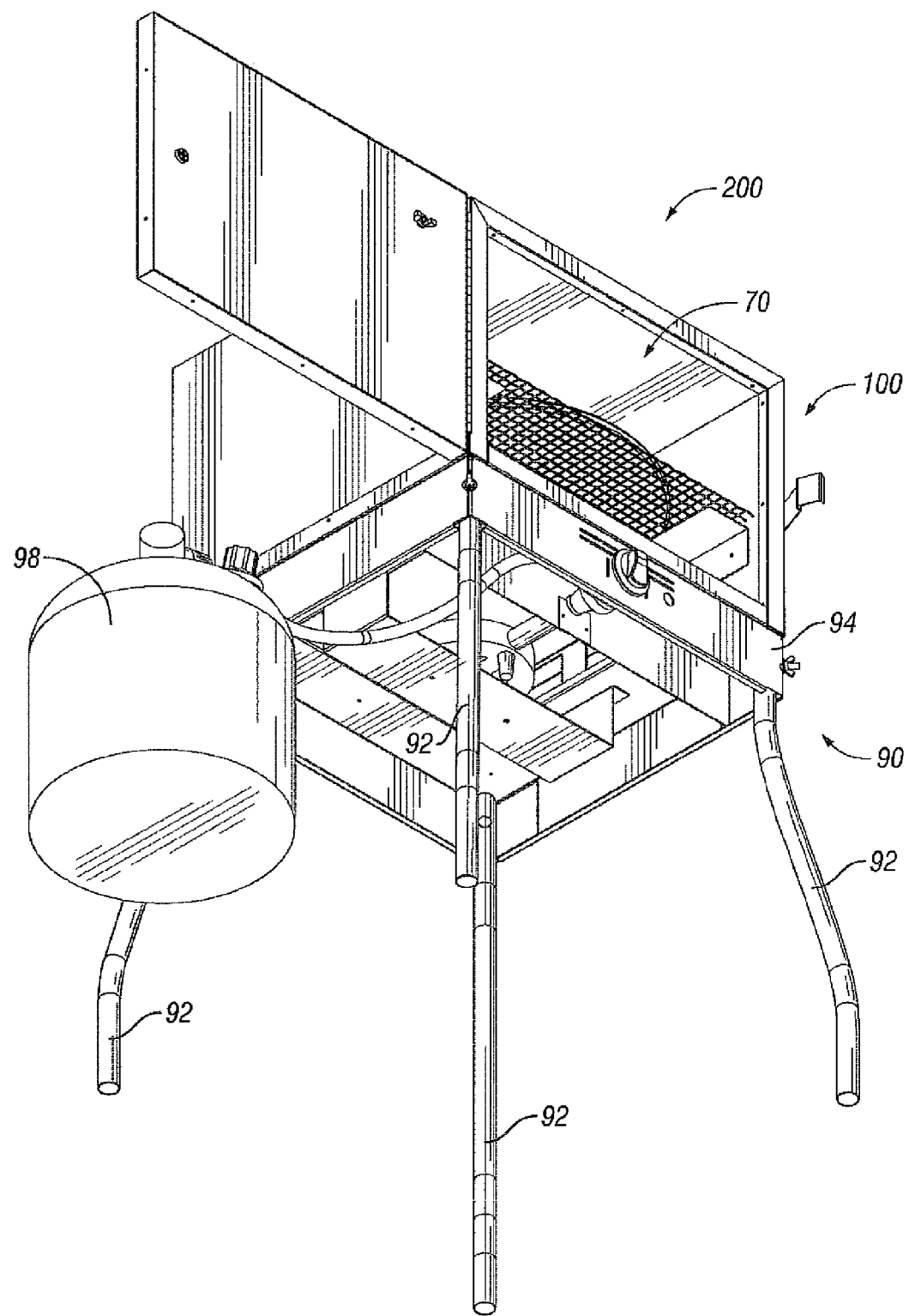
FIGS. 10A and 10B depict perspective views of one embodiment of an outdoor cooking system.
Figure 10B:
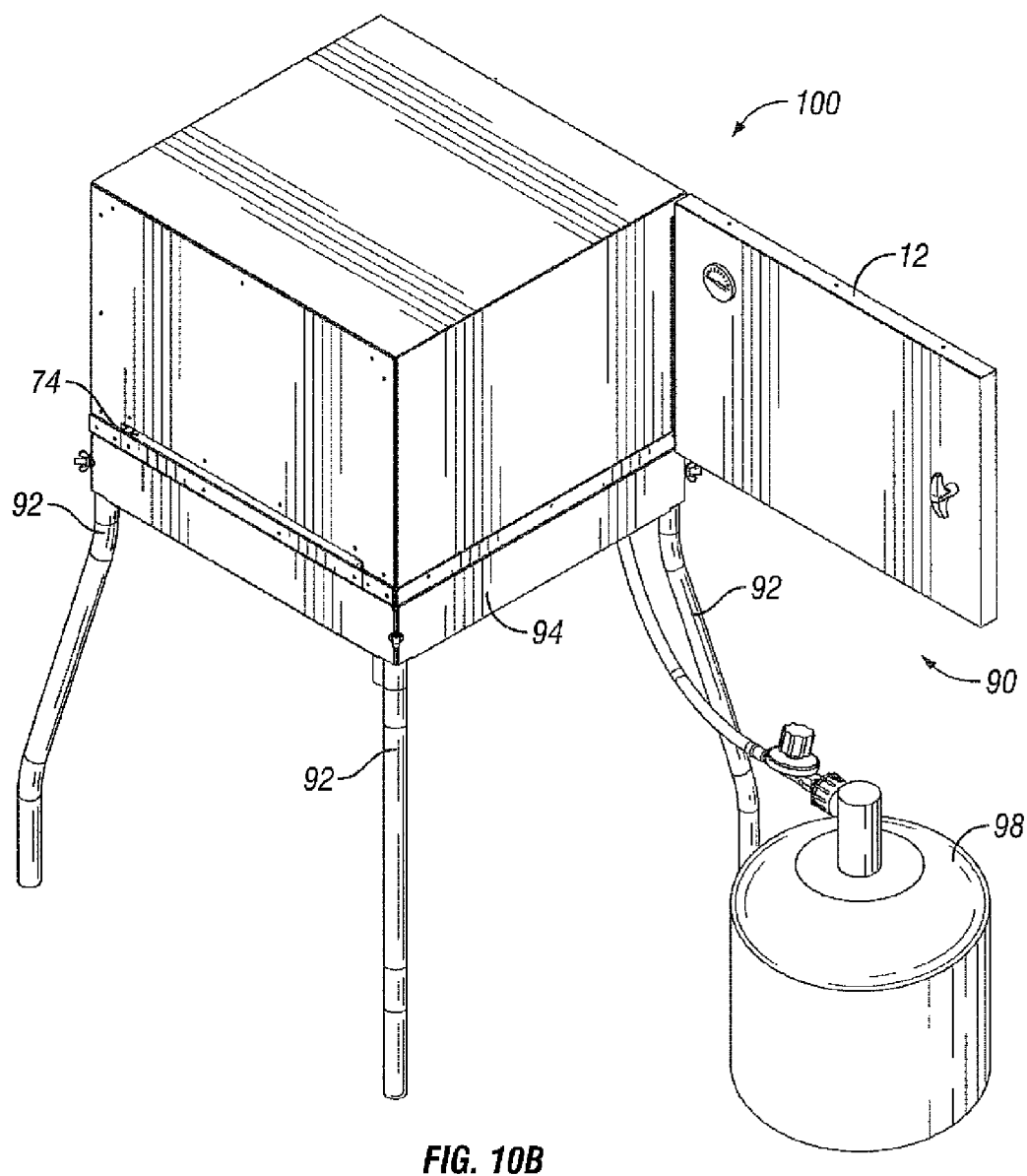

FIGS. 10A and 10B depict perspective views of one embodiment of outdoor cooking system 200 having outdoor oven 100 and support assembly 90. Support assembly 90 may include legs 92, base 94, burner 80, fuel control 96 and fuel source 98. Fuel such as propane or natural gas may flow from fuel source 98 to fuel control 96. Fuel control 96 may determine how much fuel may flow into burner 80. Fuel control 96 may allow a user to turn on/off or adjust the flow of fuel from fuel source 98 to burner 80. In some embodiments, fuel control 96 may have markings corresponding to a desired temperature in cooking chamber 70. The markings may be general, such as low, medium, and high, or may correspond to a desired temperature (e.g., a mark for every 10 degrees F.). Burner 80 may distribute the fuel to a plurality of openings 81.

in some embodiments, base 94 may include sides 95. In some embodiments, sides 95 may provide a barrier to burner 80. In some embodiments, a barrier may prevent people or things from contacting burner 80. In some embodiments, a barrier may prevent wind, rain, snow or the like from affecting the flame flowing from burner 80.

In some embodiments, legs 92 may be straight, angled or curved. In some embodiments, legs 92 may be rotatably connected to base 94. A rotatable connection may allow legs 92 to be collapsed into a first configuration for transportation or storage and extended into a second configuration for cooking. In some embodiments, legs 92 may be disconnected from base 94 for storage and transportation and may be connected to base 94 for cooking. In some embodiments, legs 92 may provide sufficient height such that air flow into opening 22 on bottom 20 is unrestricted. In some embodiments, legs 92 having a length of approximately 6 inches may provide sufficient clearance for unrestricted air flow into opening 22. In some embodiments, legs 92 may provide sufficient height for outdoor cooking system 200 to function as a stand-alone device. In some embodiments, legs 92 may be segmented or telescoping to provide support over a range of heights. In some embodiments, legs 92 may provide sufficient height such that air exiting vent 74 does not contact grass or other vegetation.

In some embodiments, support assembly 90 may include shelves, trays, hooks or other storage features (not shown). In some embodiments, support assembly 90 may include wheels. Wheels may enable outdoor cooking system 200 to be moved by a person or towed behind a vehicle.

Some embodiments disclosed herein may see greater benefits in the form of energy efficiency, such that less energy is needed to preheat cooking chamber 70 to a desired temperature and maintain the temperature. A problem with uninsulated or poorly insulated cooking devices is that the temperature of the cooking chamber is affected by the ambient air temperature. If the outdoor cooking device is used in hot weather, the effect is less noticeable. If the outdoor cooking device is used in snow, wind or rain, the effect may be noticeable in terms of longer times to preheat the cooking chamber, more fuel required to maintain a desired temperature, uneven cooking, hot spots, cold spots, undercooked food, dried out food, and the like.

Some embodiments disclosed herein may see greater benefits in the form of cooking efficiency, such that an insulated oven takes less time to preheat and may take less time to cook food to a desired temperature because the heat is retained near the food. Unlike cooking ovens that have are uninsulated or poorly insulated, the sides of cooking oven 100 inhibit heat from escaping the cooking chamber. In cold weather, the energy required to heat an insulated cooking oven 100 may be much less than the energy needed to heat an uninsulated or poorly insulated cooking oven, such that the effect of insulation may be more pronounced.

Some embodiments disclosed herein may also see greater benefits in terms of safety. A problem with uninsulated or poorly insulated cooking devices is that the outer surface of the cooking device reaches nearly the same temperature as the inner surface. As a result, if a cooking device is heated for cooking food—especially if the temperature is in the 450-600 degree F. range—a person may be burned by touching the outer surface. Some embodiments disclosed herein may greatly reduce the heat transfer between cooking chamber 70 and outer wall 28, which reduces the likelihood that someone will be burned, that a fire may start, and the like.

Some embodiments disclosed herein may see greater benefits in the form of efficacy and cooking efficiency. By retaining heat in the cooking chamber and preventing heat loss through openings or poorly insulated regions, the heat may be evenly distributed to ensure food is cooked evenly and quickly. A problem with uninsulated or poorly insulated cooking devices is the poor heat circulation and hot/cold spots result in food being undercooked in areas and overcooked in others. To prevent illness, the food must be cooked until the entire item reaches an internal temperature. Thus, outdoor cooking devices that are poorly insulated may have hot spots that burn food, cold spots that do not cook food thoroughly, may not be able to achieve a desired temperature. Attempts to alleviate this may include rotating the food periodically. However, if the heat gradient in the cooking chamber is large, many rotations may be required, which is inefficient and undesirable.

Some embodiments disclosed herein may be beneficial for cooking larger items. Those skilled in the art will appreciate that the ability for an oven to heat up to a selected temperature, maintain the temperature, and have an even temperature gradient in cooking chamber 70 provides a reliable system for cooking larger items. A large cooking chamber 70 may be beneficial for cooking pizzas and other large items. In some embodiments, the dimensions of cooking chamber 70 may be 18 inches wide, 18 inches deep and 13 inches high, which may be useful for cooking raw foods, like baked potatoes or vegetables, for cooking foods such as pizza, bread or the like, or for cooking other foods such as casseroles, cobblers or the like.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the disclosure. It is to be understood that the forms of the disclosure shown and described herein are to be taken as the presently preferred embodiments. Elements and materials may be substituted for those illustrated and described herein, parts and processes may be reversed, and certain features of the disclosure may be utilized independently, all as would be apparent to one skilled in the art after having the benefit of this description of the disclosure. Changes may be made in the elements described herein without departing from the spirit and scope of the disclosure as described in the following claims.

What is claimed is:

1. An outdoor oven, comprising:
   a combustion burner;
   a top, a bottom, and four sides forming a cooking chamber, wherein the bottom comprises an opening for receiving combustion air flow from the combustion burner, wherein the combustion burner is positioned outside the cooking chamber below the opening, wherein one side of the four sides comprises a door;
   a substantially planar baffle comprising a thickness and material selected to inhibit heat transfer through the baffle, wherein a planar dimension of the baffle is larger than a planar dimension of the opening and less than an interior dimension of the cooking chamber to permit combustion air flow to pass around the baffle and inside the cooking chamber, wherein the baffle is located inside the cooking chamber at a first distance above the opening;
   a cooking plane member positioned a distance below the cooking chamber top side and above the planar baffle and defining an upper portion and lower portion of the cooking chamber, configured for supporting items located within an upper portion of the cooking chamber, and configured to permit heated air and combustion products to pass into said upper portion of the cooking chamber above the cooking plane member and into a lower portion of the cooking chamber below the cooking plane member, wherein the lower portion of the cooking chamber is above the baffle; and
   a vent passing through the side opposite the door, whereby the cooking chamber is in communication with the environment, wherein the vent comprises a slot having a length substantially equal to a length of the cooking plane member and is located above the opening and below the baffle, wherein air exits the cooking chamber substantially through the vent.

2. The outdoor oven of claim 1, wherein one or more of the top, bottom and four sides comprises:
   an inner wall;
   an outer wall separated from the inner wall; and
   a layer of insulation disposed between the inner wall and the outer wall.

3. The outdoor oven of claim 1, wherein the door comprises:
   a first portion having a first height, first width and first depth; and
   a second portion having a second height, second width and second depth, wherein the first portion seats inside the inner walls of the cooking chamber when the cooking chamber is in a closed configuration and the second portion abuts the outer walls of the cooking chamber when the cooking chamber is in a closed configuration.

4. The outdoor oven of claim 1, wherein the baffle is circular, wherein the diameter of the baffle is greater than the planar dimension of the opening.

5. The outdoor oven of claim 1, wherein the baffle is rectangular, wherein a length of the baffle is greater than the planar dimension of the opening.

6. The outdoor oven of claim 1, wherein the door is hingedly connected to the outdoor oven.

7. The outdoor oven of claim 1, wherein the cooking plane member further comprises a ceramic stone.

8. The outdoor oven of claim 1, wherein the baffle comprises one of steel, ceramic or aluminum.

9. The outdoor oven of claim 1, wherein the baffle is located inside the cooking chamber at a first distance of at least one inch above the opening.

10. An outdoor cooking system, comprising:
    a combustion burner;
    a top, a bottom, and four sides forming a cooking chamber, wherein the bottom comprises an opening for receiving combustion air flow from the combustion burner, wherein the combustion burner is positioned outside the cooking chamber below the opening, wherein one side of the four sides comprises a door;
    a substantially planar baffle comprising a thickness and material selected to inhibit heat transfer through the baffle, wherein a planar dimension of the baffle is larger than a planar dimension of the opening and less than an interior dimension of the cooking chamber to permit combustion air flow to pass around the baffle and inside the cooking chamber, wherein the baffle is located inside the cooking chamber at a first distance above the opening;
    a cooking plane member positioned a distance below the cooking chamber top side and above the planar baffle and defining an upper portion and lower portion of the cooking chamber, configured for supporting items located within an upper portion of the cooking chamber, and configured to permit heated air and combustion circulates in the upper portion of the cooking chamber above the cooking plane member and in the lower portion of the cooking chamber below the cooking plane member;
    a vent passing through the side opposite the door, whereby the cooking chamber is in communication with the environment, wherein the vent comprises a slot having a length substantially equal to a length of the cooking plane member and is located above the opening and below the baffle, wherein air exits the cooking chamber substantially through the vent;
    a fuel source for supplying fuel to the combustion burner; and
    a base for supporting the cooking chamber, comprising:
       a top surface having an opening corresponding to the opening in the bottom of the cooking chamber; and
       a burner control valve for controlling the fuel flow from the fuel source to the combustion burner, wherein the size and position of one or more of the combustion burner, the baffle and the vent cooperate to circulate heat through the cooking chamber.

11. The outdoor oven of claim 10, wherein one or more of the top, bottom and four sides comprises:
- an inner wall;
- an outer wall separated from the inner wall; and
- a layer of insulation disposed between the inner wall and the outer wall.

12. The outdoor oven of claim 10, wherein the door comprises:
- a first portion having a first height, first width and first depth; and
- a second portion having a second height, second width and second depth, wherein the first portion seats inside the inner walls of the cooking chamber when the cooking chamber is in a closed configuration and the second portion abuts the outer walls of the cooking chamber when the cooking chamber is in a closed configuration.

13. The outdoor oven of claim 10, wherein the base comprises a set of legs for supporting one or more of the cooking chamber, the combustion burner, and the fuel source.

14. The outdoor oven of claim 10, wherein the door is hingedly connected to the outdoor oven.

15. The outdoor oven of claim 10, wherein the cooking plane member further comprises a ceramic stone.

16. The outdoor oven of claim 10, wherein the baffle comprises one of steel, ceramic or aluminum.

17. A portable outdoor cooking apparatus, comprising:
- a combustion burner;
- a top, a bottom, and four sides forming a cooking chamber, wherein the bottom comprises an opening for receiving combustion air flow from the combustion burner, wherein the combustion burner is positioned outside the cooking chamber below the opening, wherein one side of the four sides comprises a door;
- a substantially planar baffle comprising a thickness and material selected to inhibit heat transfer through the baffle, wherein a planar dimension of the baffle is larger than a planar dimension of the opening and less than an interior dimension of the cooking chamber to permit combustion air flow to circulate around the baffle and inside the cooking chamber, wherein the baffle is located inside the cooking chamber at a first distance above the opening;
- a cooking plane member positioned a distance below the cooking chamber top side and above the planar baffle and defining an upper portion and lower portion of the cooking chamber, configured for supporting items located within an upper portion of the cooking chamber, and configured to permit heated air and combustion circulates in the upper portion of the cooking chamber above the cooking plane member and in the lower portion of the cooking chamber below the cooking plane member;
- a vent passing through the side opposite the door, whereby the cooking chamber is in communication with the environment, wherein the vent comprises a slot having a length substantially equal to a length of the cooking plane member and is located above the opening and below the baffle, wherein air exits the cooking chamber substantially through the vent;
- a fuel source for supplying fuel to the combustion burner; and
- a base for supporting the cooking chamber, comprising:
  - a top side having an opening corresponding to the opening in the bottom side of the cooking chamber;
  - a burner control valve for controlling the fuel flow from the fuel source to the combustion burner; and
  - four sides extending down from the top side, wherein the size and position of one or more of the burner, the baffle and the vent cooperate to circulate combustion air flow through the cooking chamber.

18. The portable outdoor cooking apparatus of claim 17, wherein the door comprises:
- a first portion having a first height, first width and first depth; and
- a second portion having a second height, second width and second depth, wherein the first portion seats inside the inner walls of the cooking chamber when the cooking chamber is in a closed configuration and the second portion abuts the outer walls of the cooking chamber when the cooking chamber is in a closed configuration.

19. The portable outdoor cooking apparatus of claim 17, wherein the cooking plane member further comprises a ceramic stone.

20. The portable outdoor cooking apparatus of claim 17, wherein the door is hingedly connected to the outdoor oven.

* * * * *